United States Patent
Atwood et al.

(10) Patent No.: US 9,943,886 B2
(45) Date of Patent: Apr. 17, 2018

(54) EJECTOR HEAD CLEANING CART FOR THREE-DIMENSIONAL OBJECT PRINTING SYSTEMS

(71) Applicant: Xerox Corporation, Norwalk, CT (US)

(72) Inventors: Mark A. Atwood, Rush, NY (US); James J. Spence, Honeoye Falls, NY (US)

(73) Assignee: Xerox Corporation, Norwalk, CT (US)

( * ) Notice: Subject to any disclaimer, the term of this patent is extended or adjusted under 35 U.S.C. 154(b) by 280 days.

(21) Appl. No.: 14/560,426

(22) Filed: Dec. 4, 2014

(65) Prior Publication Data

US 2016/0158818 A1 Jun. 9, 2016

(51) Int. Cl.
*B08B 1/00* (2006.01)
*B33Y 30/00* (2015.01)
*B29C 67/00* (2017.01)

(52) U.S. Cl.
CPC .............. *B08B 1/008* (2013.01); *B08B 1/005* (2013.01); *B29C 67/0059* (2013.01); *B33Y 30/00* (2014.12)

(58) Field of Classification Search
CPC ......... B08B 1/008; B08B 1/005; B33Y 30/00; B29C 67/0055; B29C 67/0059
See application file for complete search history.

(56) References Cited

U.S. PATENT DOCUMENTS

| | | | |
|---|---|---|---|
| 5,980,018 A | * | 11/1999 | Taylor .................. B41J 2/16547 347/31 |
| 6,773,088 B2 | | 8/2004 | Aldrich et al. |
| 7,188,927 B2 | | 3/2007 | Anderson, Jr. et al. |
| 8,167,395 B2 | | 5/2012 | Fienup et al. |
| 2006/0061613 A1 | | 3/2006 | Fienup et al. |
| 2013/0293652 A1 | | 11/2013 | Spence et al. |
| 2014/0125749 A1 | | 5/2014 | Spence |
| 2014/0271328 A1 | * | 9/2014 | Burris .................. B23K 26/034 419/53 |

* cited by examiner

*Primary Examiner* — Ryan Ochylski
(74) *Attorney, Agent, or Firm* — Maginot Moore & Beck LLP

(57) ABSTRACT

A cleaning cart for a three-dimensional object printing system wipes an ejector head to remove debris from the ejector head. The cleaning cart includes a platform having a plurality of bearings configured to move the platform on rails of the printing system. A cleaning mechanism is movably mounted to the platform, and an actuator is mounted to the platform. The actuator is configured to move the cleaning mechanism relative to the platform to enable the cleaning mechanism to clean an ejector head that is positioned opposite the rails of the printing system.

12 Claims, 12 Drawing Sheets

EJECTOR HEAD CLEANING CART FOR THREE-DIMENSIONAL OBJECT PRINTING SYSTEMS

TECHNICAL FIELD

The system and method disclosed in this document relate to printers that produce three-dimensional objects and, more particularly, to cleaning mechanisms in such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Typically, ejector heads, which are similar to printheads in document printers, include an array of ejectors that are coupled to a supply of material. Ejectors within a single ejector head can be coupled to different sources of material or each ejector head can be coupled to different sources of material to enable all of the ejectors in an ejector head to eject drops of the same material. Materials that become part of the object being produced are called build materials, while materials that are used to provide structural support for object formation, but are later removed from the object are known as support materials. Three-dimensional printing is distinguishable from traditional object-forming techniques, which mostly rely on the removal of material from a work piece by a subtractive process, such as cutting or drilling.

A prior art three-dimensional object printing system 10 is shown in FIG. 12. In the view depicted in that figure, a platform 14, called a cart, includes wheels 18 (FIG. 11) that ride upon track rails 22 to enable the cart to move in a process direction P between printing stations, such as the printing station 26 shown in FIG. 12. Printing station 26 includes four ejector heads 30 as shown in the figure, although fewer or more ejector heads can be used in a printing station. Once the cart 14 reaches the printing station 26, the cart 14 transitions to enable bearings 34 to roll upon precision rails 38. Precision rails 38 are cylindrical rail sections that are manufactured within tight tolerances to help ensure accurate placement and maneuvering of the cart 14 beneath the ejector heads 30. Linear electrical motors are provided within housing 42 and are operatively connected to the wheels 18 of cart 14 to move the cart along the track rails 22 and to the bearings 34 to maneuver the cart 14 on the precision rails 38. Once the cart 14 is beneath the printing station 26, ejection of material occurs in synchronization with the motion of the cart. The electrical motors in housing 42 are also configured move the cart in an X-Y plane that is parallel to the ejector heads 30 as layers of material are formed in the object. Additional motors (not shown) move the printing station 26 vertically with respect to the cart 14 as layers of material accumulate to form an object. Alternatively, a mechanism can be provided to move the cart 14 vertically with respect to rails 38 as the object is formed on the top surface of the cart. Once the printing to be performed by a printing station is finished, the cart 14 is moved to another printing station for further part formation or for layer curing or other processing.

An end view of the prior art system 10 is shown in FIG. 11. That view depicts in more detail the wheels 18 on which the cart 14 rides the track rails 22. Bearings 34 of the cart 14 are positioned on the precision rails 38 in an arrangement that facilitates accurate positioning of the build platen on the cart 14. Specifically, bearings 34 are positioned at a right angle to one another on one of the rails 38 to remove 4 degrees of freedom of the cart 14, while the other bearing 34 rests on the other rail 38 to remove one more degree of freedom. A linear motor operates to move the cart 14 over an upper surface 50 of the housing 42. The motor has a stationary motor segment within the housing 42 and a magnet 46 mounted to the underside of the cart 14. Gravity and magnetic attraction between the stationary motor segment and the magnet 46 hold the bearings 34 in contact with the rails 38.

When carts are not present underneath the ejector heads 30, errant drips of materials can fall from the ejector heads and produce undesired debris and contamination on the precision rails 38 and the housing 42. Also, air-borne contaminants in the environment, such as dust or other particulate matter, can fall and collect on the rails 38 and the housing 42. When these contaminants and debris are located at any interface between the bearings 34 and the rails 38, the linear velocity of the cart is disrupted and the quality of the printed object is affected. Similarly, when these materials are within the gap between the top surface 50 of the housing 42 and the magnet 46, the magnetic attraction can be affected and enable the cart to be less constrained. Additionally, the collection of material drops on top of the housing 42 can also affect the dissipation of heat from the motor and cause motion quality disturbances, impacting the performance and reliability of the motor. In order to produce three-dimensional objects with acceptable quality, the motion of the cart 14 beneath the ejector heads 30 needs to be precise. Therefore, improvements in three-dimensional printing systems that help eliminate the contamination on the precision rails and motor housing that affects the accuracy of the placement and movement of the cart would be beneficial.

SUMMARY

An ejector head cleaning cart for a three-dimensional object printing system collects ejected materials and other debris from the ejector heads. The ejector head cleaning cart includes a platform including a plurality of bearings configured to move the platform on rails of the printing system, a cleaning mechanism movably mounted to the platform, and an actuator mounted to the platform. The actuator is configured to move the cleaning mechanism relative to the platform to enable the cleaning mechanism to clean an ejector head that is positioned opposite the rails of the printing system.

A three-dimensional object printing system that incorporates improved cleaning carts includes at least one rail, an ejector head positioned opposite the at least one rail, and a cleaning cart. The cleaning cart includes a platform having a plurality of bearings configured to engage the at least one rail to move the platform on the at least one rail, a cleaning mechanism movably mounted to the platform, and an actuator mounted to the platform. The actuator is configured to move the cleaning mechanism relative to the platform to enable the cleaning mechanism to clean the ejector head of the printing system.

A method of cleaning an ejector head of a three-dimensional object printing system collects ejected materials and other debris from the ejector head. The method includes moving a cleaning cart in a process direction to a first cart position at which a cleaning mechanism of the cleaning cart is located adjacent an ejector head, moving the ejector head from an initial ejector head position spaced apart from the cleaning mechanism to a first ejector head position at which the ejector head contacts the cleaning mechanism, and moving the cleaning mechanism relative to a platform of the cleaning cart from a first cleaning mechanism position to a second cleaning mechanism position such that the cleaning mechanism moves across the ejector head to remove material from the ejector head.

BRIEF DESCRIPTION OF THE DRAWINGS

The foregoing aspects and other features of a cart that helps eliminate the collection of materials from the ejectors heads and other debris are explained in the following description, taken in connection with the accompanying drawings.

DETAILED DESCRIPTION

Figure 1:
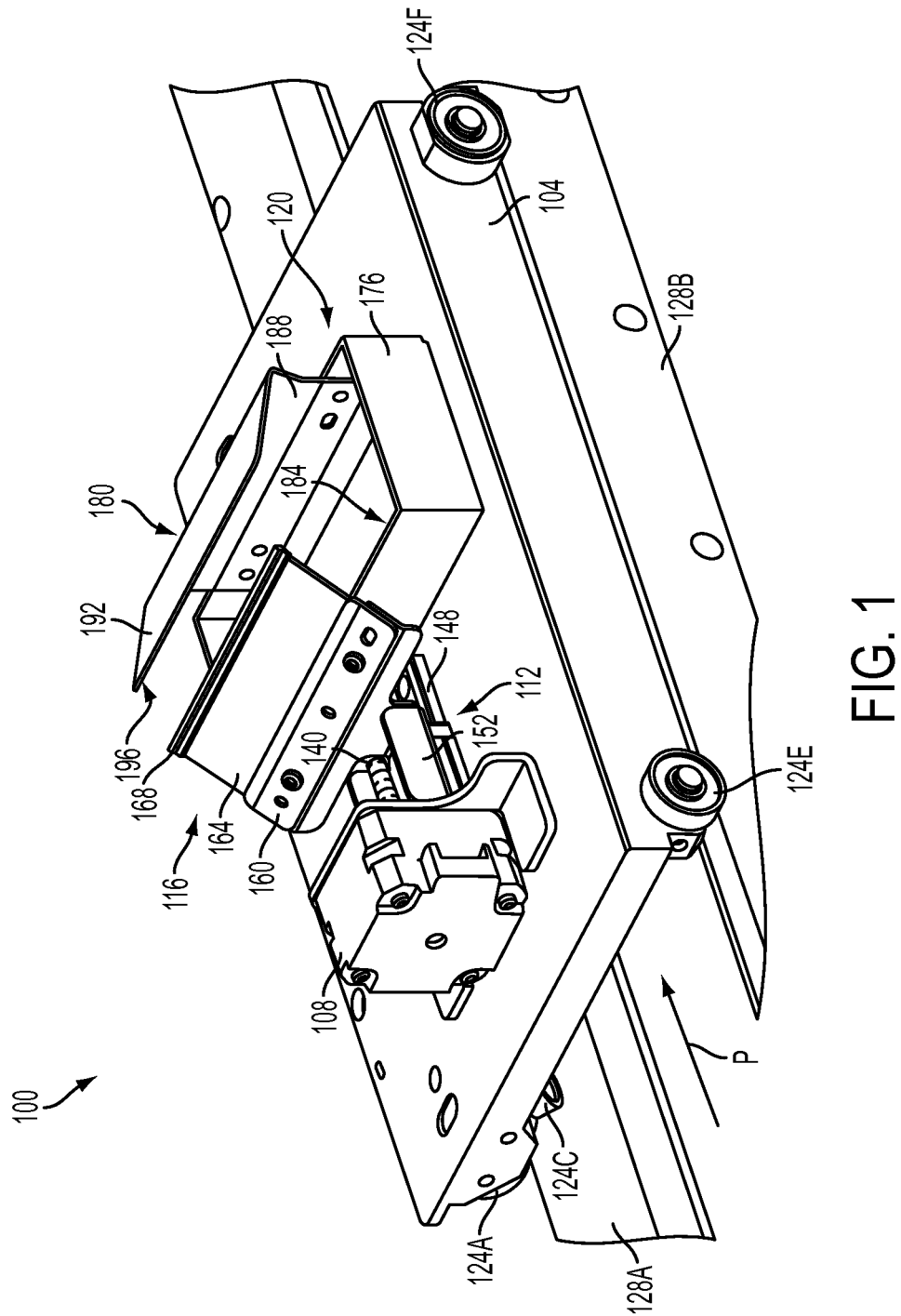
FIG. 1 is a rear perspective view of an ejector head cleaning cart of a three-dimensional object printing system.

For a general understanding of the environment for the system and method disclosed herein as well as the details for the system and method, reference is made to the drawings. In the drawings, like reference numerals have been used throughout to designate like elements.

Figure 2:
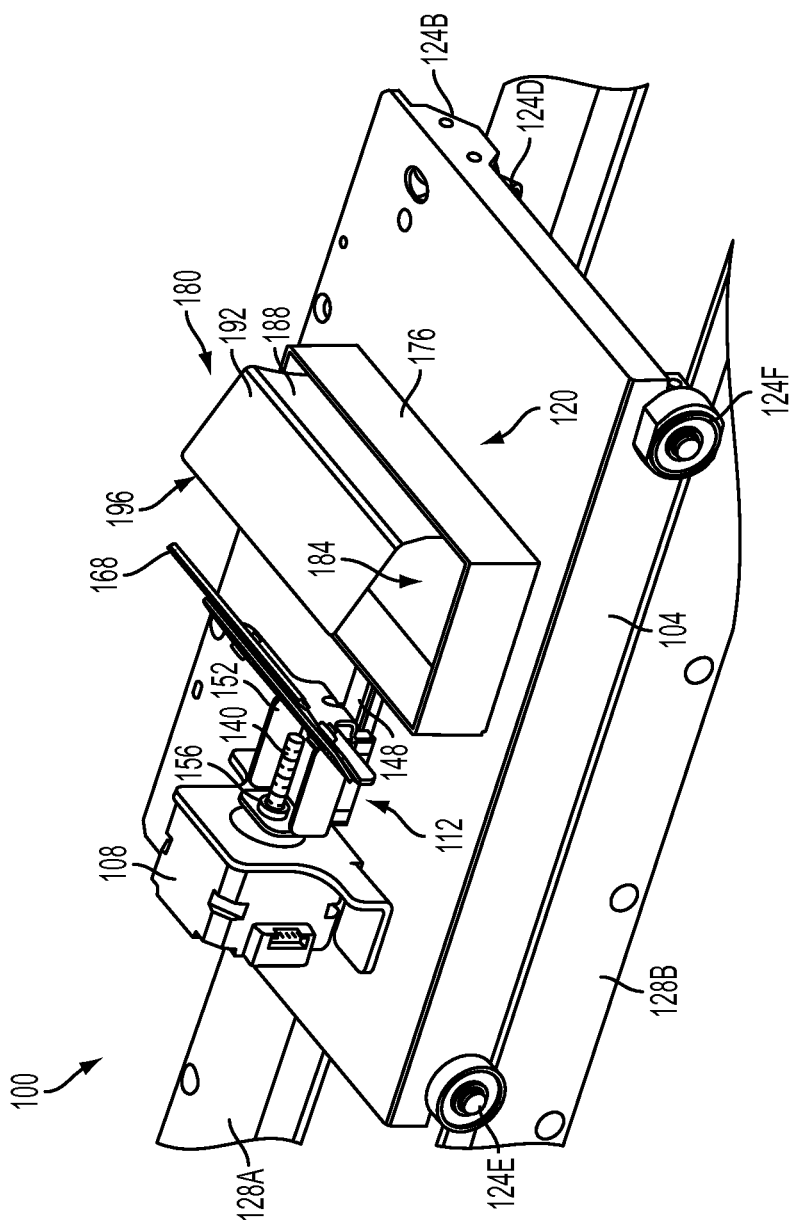
FIG. 2 is a front perspective view of the ejector head cleaning cart of FIG. 1.
Figure 3:
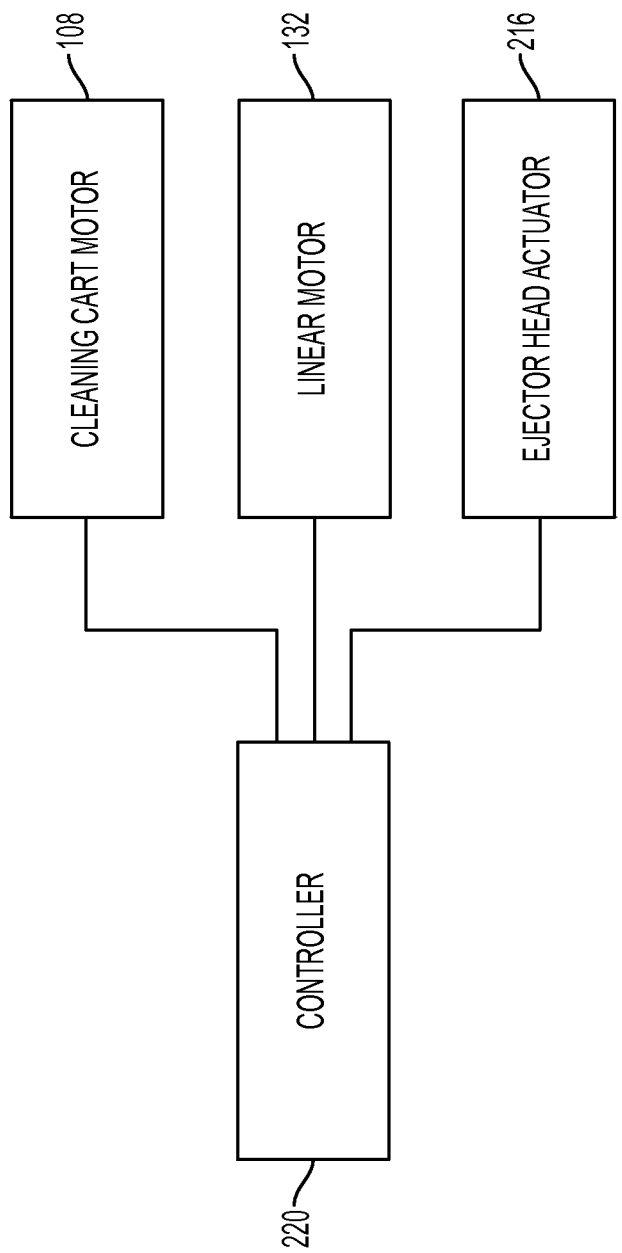
FIG. 3 is a schematic diagram of the controller, motors, and actuator of a three-dimensional object printing system including the ejector head cleaning cart of FIG. 1.

FIG. 1 and FIG. 2 illustrate an ejector head cleaning cart 100 for a three-dimensional printing system. The cleaning cart 100 includes a platform 104, an actuator or motor 108 (also referred to herein as a cleaning cart motor), a linear slide system 112, a wiper 116, and a reservoir 120. The platform 104 has six bearings 124A-124F, of which four bearings 124A-124D contact a first rail 128A of the printing system, and the other two bearings 124E and 124F contact a second rail 128B. The bearings 124A-124F are configured to support the platform 104 on the rails 128A, 128B as a linear motor 132 (FIG. 3) rotates the bearing 124A-F to move the platform 104 along the rails 128A, 128B.

The motor 108 is fixedly mounted on the platform 104 and includes a lead screw 140 extending outwardly from the motor in the direction of the wiper 116. In the embodiment of FIG. 1 and FIG. 2, the lead screw 140 extends in the process direction P, though in other embodiments the lead screw can extend from the motor in different directions. In one embodiment, the motor 108 is a stepper motor configured to rotate the lead screw 140 at specified intervals.

The linear slide 112 includes a fixed support 148, a sliding member 152, and a threaded ring 156. The fixed support 148 is fixedly mounted to the platform 104. The sliding member 152 is mounted slidably on the fixed support 148 such that the sliding member 152 can move only in one linear direction. In the embodiment of FIG. 1 and FIG. 2, the sliding member 152 is movable only in the process direction, though the sliding member is configured to move in different directions in other embodiments. The threaded ring 156 attached to the sliding member 152 and is threaded around the lead screw 140 such that rotation of the lead screw 140 during activation of the motor 108 moves the threaded ring 156 along the threads of the lead screw 140 in the linear direction, thereby moving the sliding member 152 in the linear direction.

The wiper 116 includes a wiper mount 160, a wiper member 164, and a wiper blade 168. The wiper mount 160 is fixedly attached to the sliding member 152 of the linear slide 112 such that the linear movement of the sliding member 152 relative to the platform 104 moves the wiper mount 160 in the linear direction. The wiper member 164 is mounted in the wiper mount 160 such that the wiper member 164 extends upwardly at an angle relative to vertical. In one embodiment, the wiper member 164 extends upwardly at an angle of approximately 45 degrees relative to vertical. The wiper blade 168 is attached to the edge of the wiper member 164 opposite the wiper mount 160. The wiper blade 168 is formed of a deformable elastomeric material, for example polyurethane, to enable the wiper to deform to the shape of an ejector head when pressed against the ejector head.

The reservoir 120 is fixedly mounted on the platform 104 opposite the motor 108 from the wiper 116 and includes a reservoir tray 176 and a flexure member 180. The reservoir tray 176 defines an inner volume 184 in which collected debris are stored. The flexure member 180 has a first portion 188 extending generally vertically from a side wall of the reservoir tray 176, and a second portion 192 extending at an angle to vertical. In one embodiment, the second portion extends at an angle of about 60 degrees relative to vertical. The uppermost edge 196 of the flexure member 180 is essentially in the same plane as the wiper blade 168. In the embodiment of FIG. 1 and FIG. 2, the plane in which the uppermost edge 196 of the flexure member 180 and the wiper blade 168 are located is parallel to a horizontal plane in which the platform 104 moves in the process direction P.

The cleaning cart 100 is configured to be used in a three-dimensional object printing system 200 (FIG. 4-FIG. 9). The printing system 200 includes an ejector head unit 204 having two ejector heads 208, 212. The ejector head unit 204 is operatively connected to an ejector head actuator 216, which is configured to move the ejector head unit 204 in the vertical direction to position the ejector heads 208, 212 at a desired position.

The printing system 200 includes a controller 220 (FIG. 3) operatively connected to the motor 108 of the cleaning cart 100, the linear motor 132, and the ejector head actuator 216. The controller 220 is configured to transmit electrical signals to the motor 108, the linear motor 132, and the ejector head actuator 216 to operate the motors 108, 132, and actuator 216 and move the components operatively connected to the motors.

Operation and control of the various components and functions of the printing system 200 are performed with the aid of the controller 220. The controller 220 is implemented with a general or specialized programmable processor that executes programmed instructions. In some embodiments, the controller includes more than one general or specialized programmable processor. The instructions and data required to perform the programmed functions are stored in a memory unit associated with the controller. The processor, memory, and interface circuitry configure the controller 220 to perform the functions and processes described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits.

Figure 9:
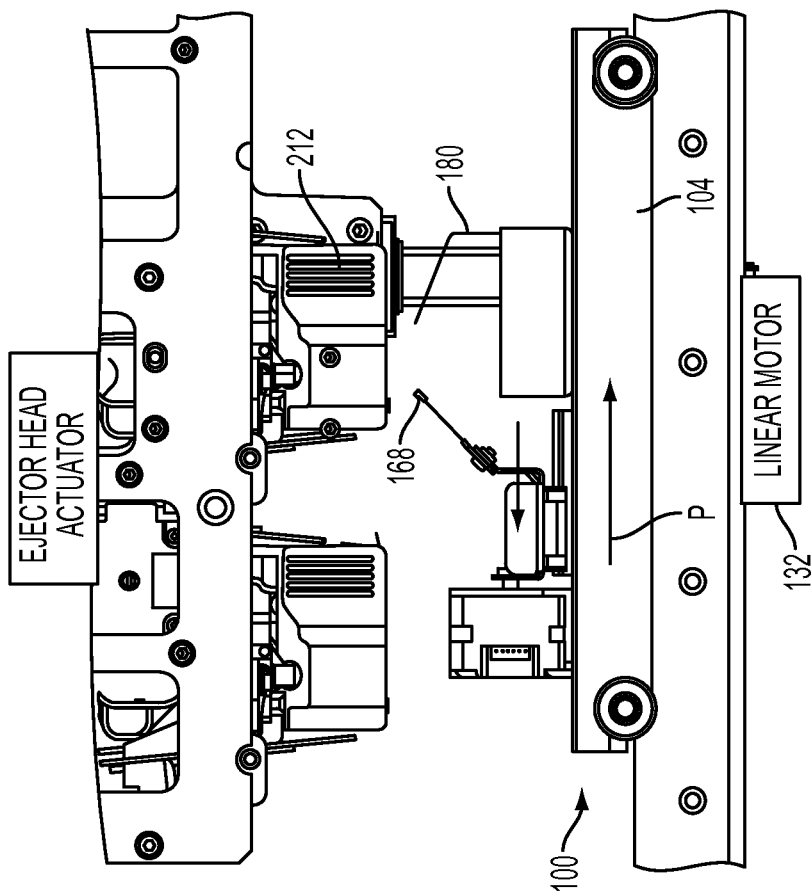
FIG. 9 is a side elevational view of the three-dimensional object printing system of FIG. 3 showing the ejector head cleaning cart moved adjacent to a second ejector head.
Figure 10:
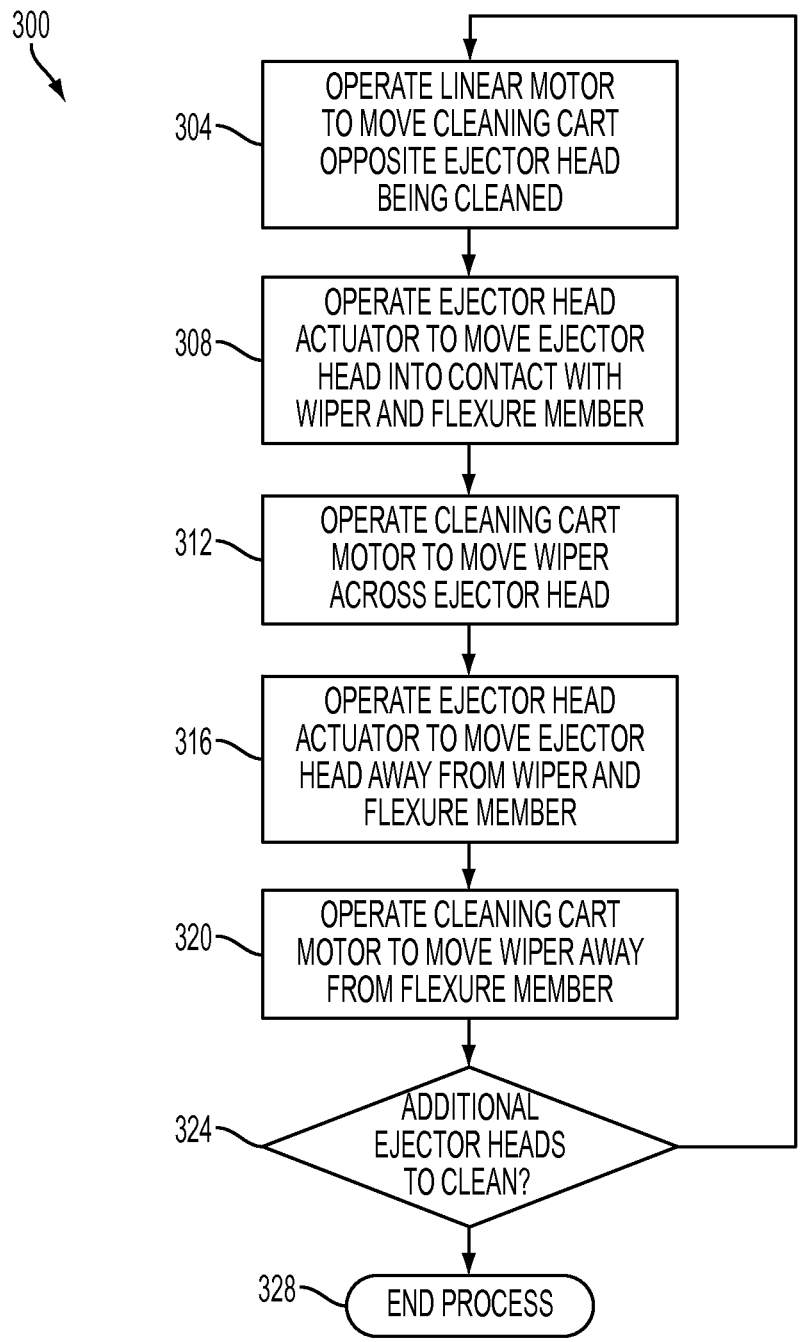
FIG. 10 is a process diagram of a method of cleaning an ejector head of a three-dimensional object printing system.
Figure 11:
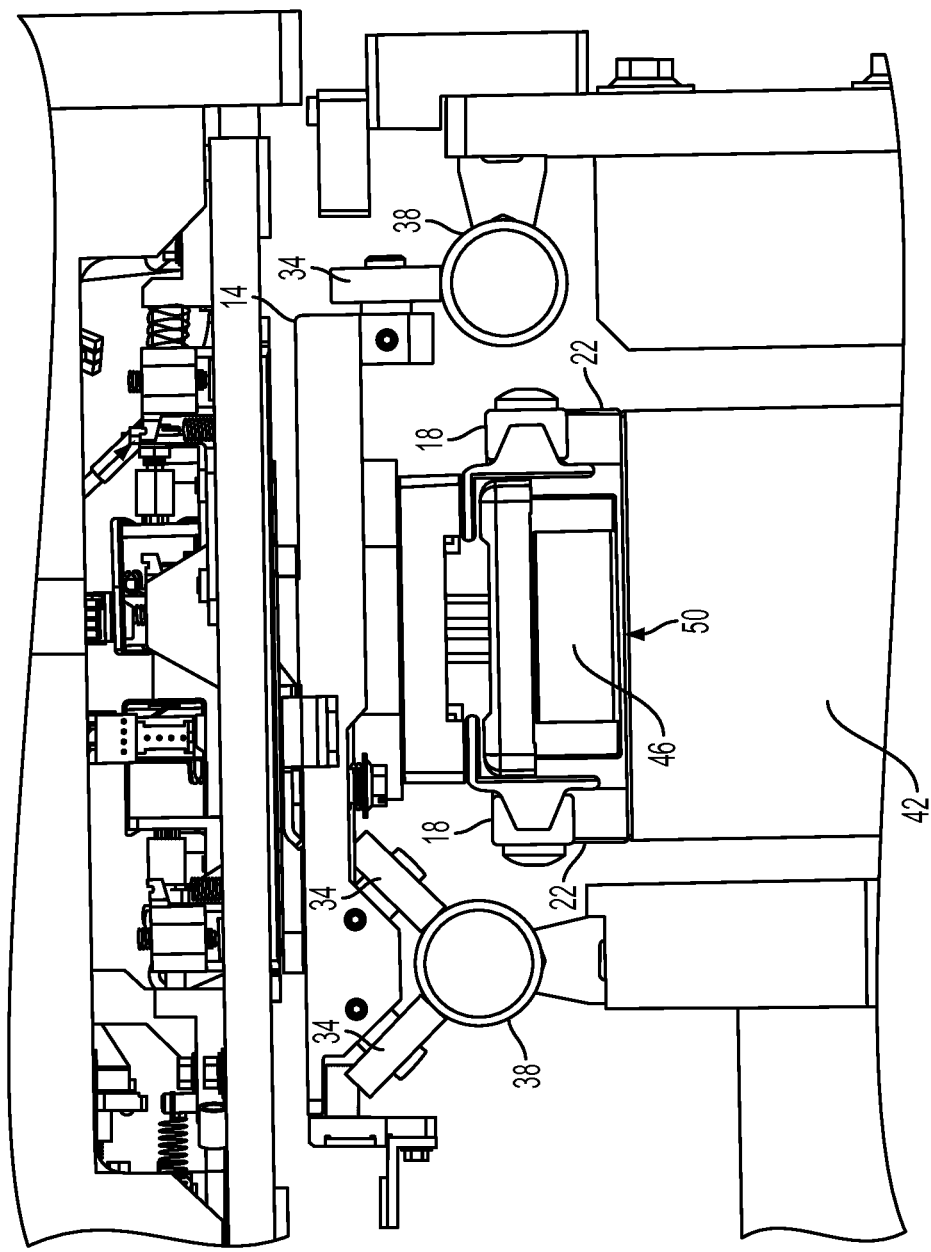
FIG. 11 is a front elevational view of a prior art three-dimensional object printing system.
Figure 12:
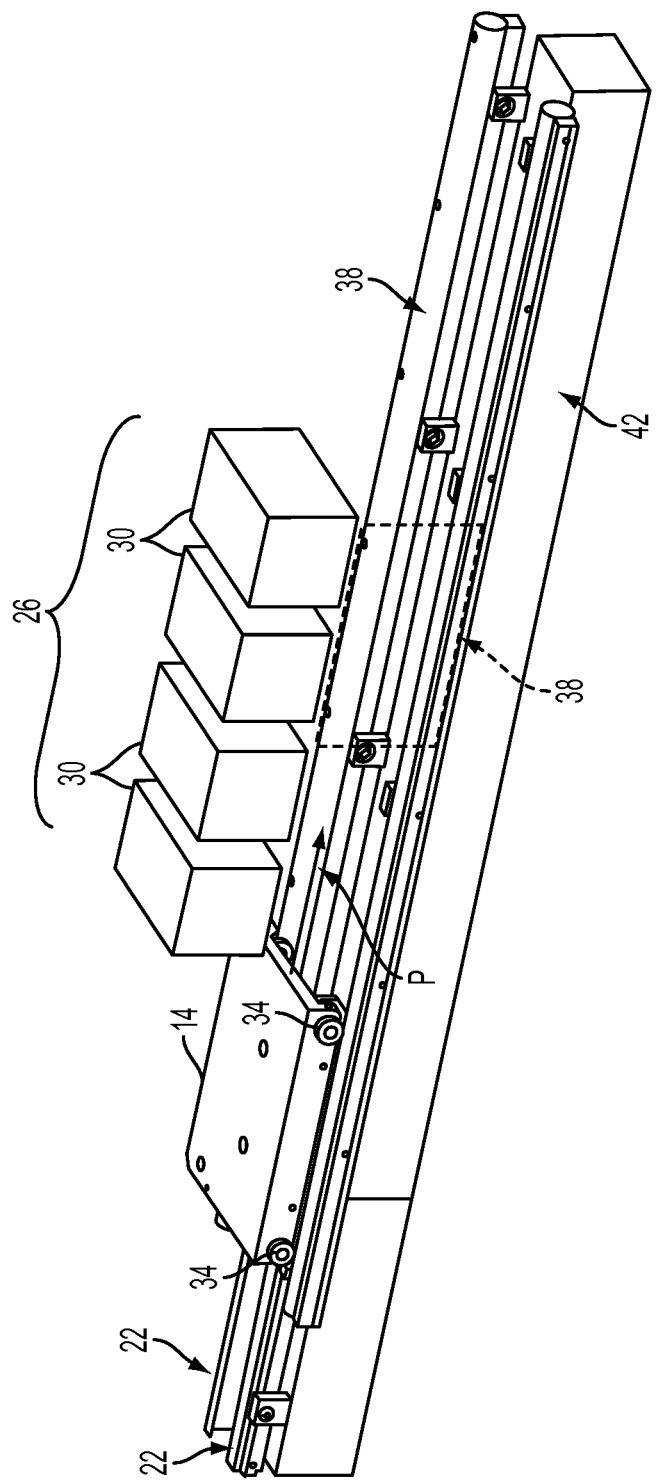
FIG. 12 is a side perspective view of the three-dimensional object printing system of FIG. 10.

FIG. 10 illustrates a method 300 of cleaning ejector heads in a three-dimensional object printing system. The discussion herein of the method 300 is described with reference to the printing system 200 and cleaning cart 100 discussed above and shown in FIG. 1-FIG. 9 for illustrative purposes.

Figure 4:
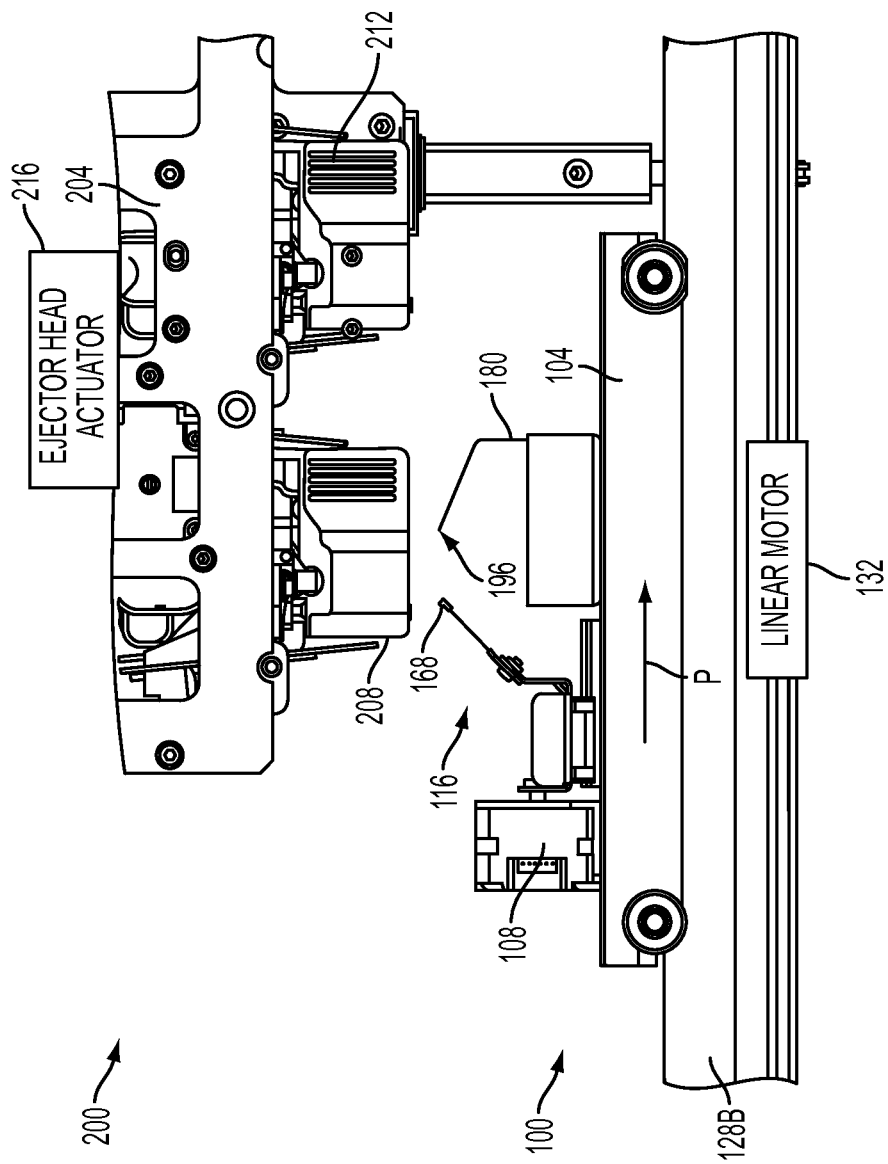
FIG. 4 is a side elevational view of the three-dimensional object printing system of FIG. 3 in which the ejector head cleaning cart is positioned opposite a first ejector head.
Figure 5:
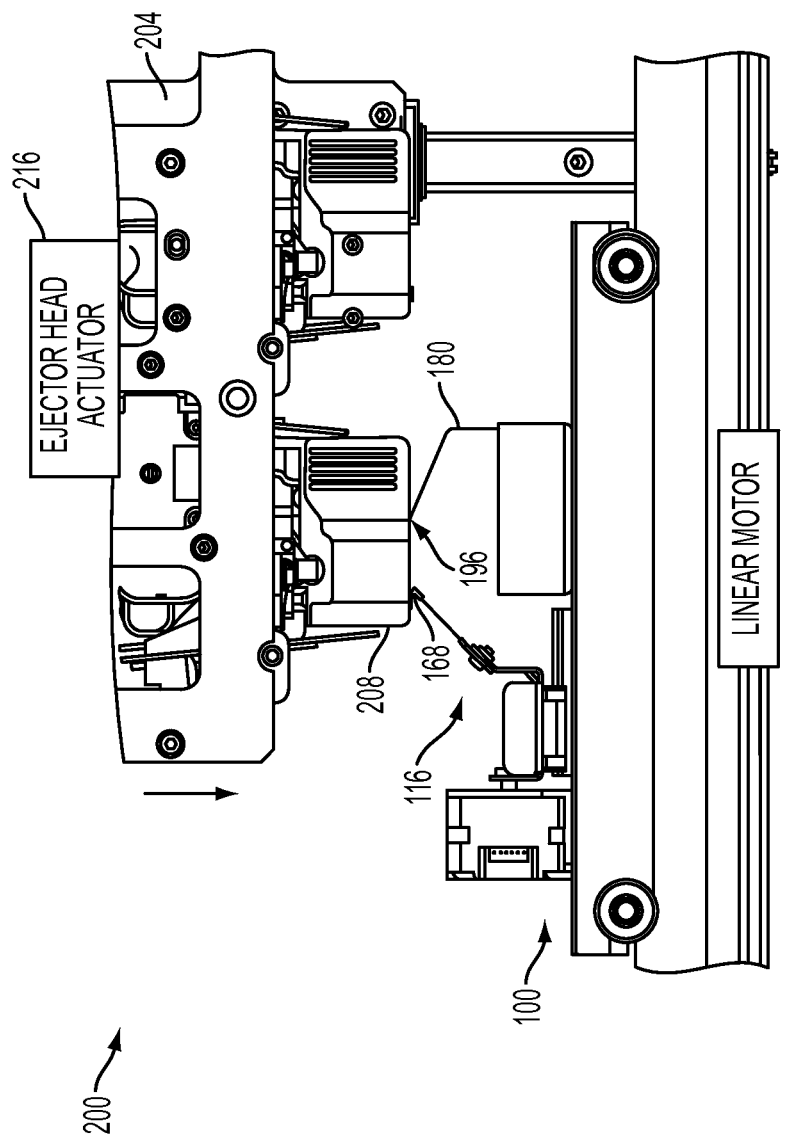
FIG. 5 is a side elevational view of the three-dimensional object printing system of FIG. 3 in which the first ejector head is engaged with the wiper and flexure member of the ejector head cleaning cart.
Figure 6:
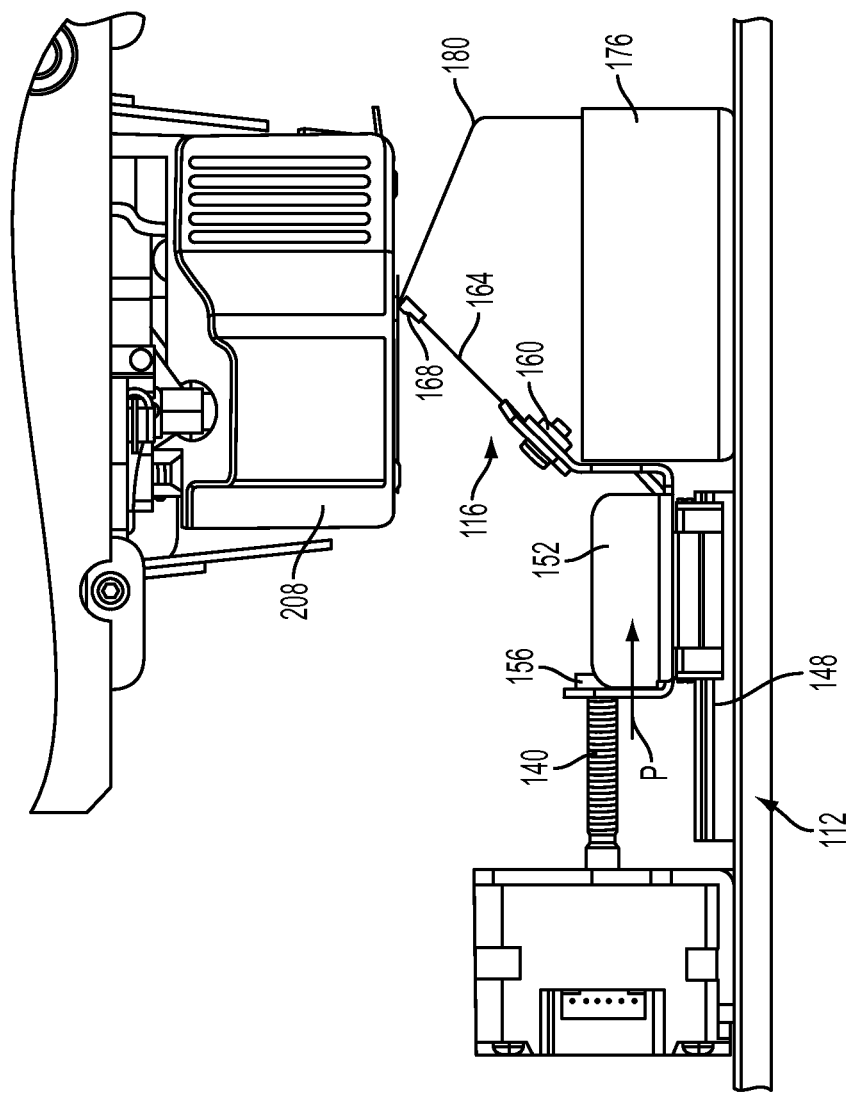
FIG. 6 is a side elevational view of the three-dimensional object printing system of FIG. 3 in which the wiper of the ejector head cleaning cart is contacting the flexure member after wiping the ejector head.

The method 300 begins with the controller 220 operating the linear motor 132 to move the cleaning cart 100 in the process direction P to a position opposite the ejector head 208 (block 304), as shown in FIG. 4. Next, the controller 220 operates the ejector head actuator 216 to move the ejector head unit 204 until the face of the ejector head 204 contacts the wiper blade 168 and the edge 196 of the flexure member 180 (block 308) as illustrated in FIG. 5. The controller 220 then operates the cleaning cart motor 108 to rotate the lead screw 140, moving the threaded ring 156, sliding piece 152, and wiper 116 in the process direction P relative to the platform 104 of the cleaning cart 100 (block 312). The wiper blade 168 moves across the face of the ejector head 208, wiping debris from the ejector head 168 as the wiper blade 168 moves to the position shown in FIG. 6. Solid debris particles wiped by the wiper blade 168 either fall from the ejector head 208 into the reservoir tray 176 or are entrained in liquid on the ejector head 208. Liquid on the ejector head 208 is then wiped onto the flexure member 180, where capillary action carries the liquid and entrained particles down the flexure member 180 and into the reservoir tray 176.

Figure 7:
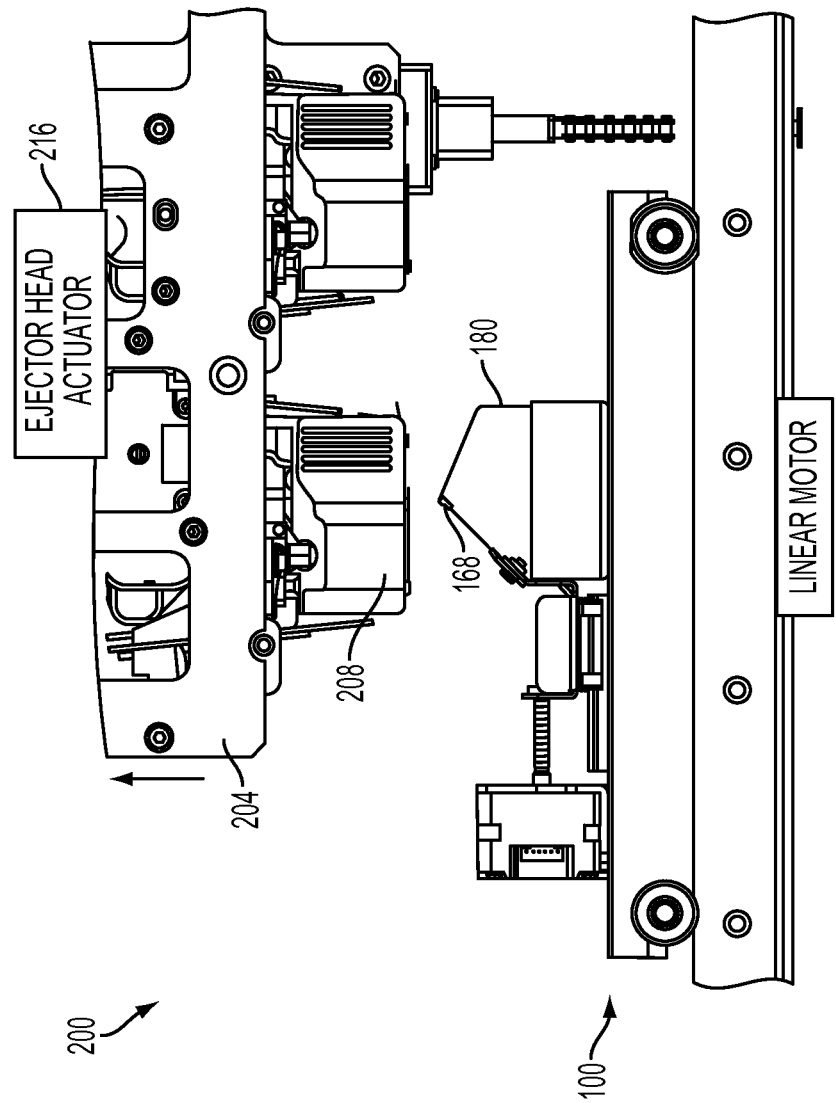
FIG. 7 is a side elevational view of the three-dimensional object printing system of FIG. 3 showing the printhead retracted and spaced apart from the wiper and flexure member of the ejector head cleaning cart.
Figure 8:
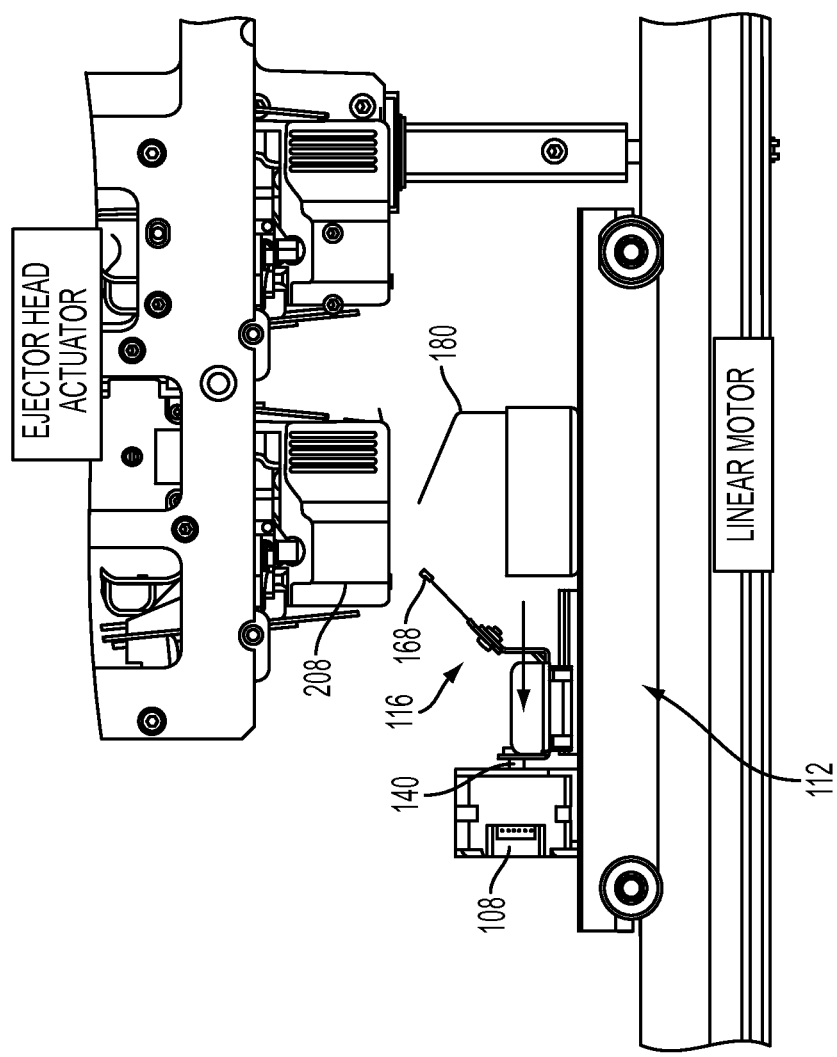
FIG. 8 is a side elevational view of the three-dimensional object printing system of FIG. 3 showing the wiper of the ejector head cleaning cart moved away from the flexure member.

Once the face of the ejector head 208 has been wiped, the controller 220 operates the ejector head actuator 216 to move the ejector head unit 204 out of engagement with the wiper blade 168 and flexure chute 180 to the position shown in FIG. 7 (block 316). The controller 220 operates the cleaning cart motor 108 to move the wiper 116 in a direction opposite to the process direction away from the flexure member 180 to the initial position (block 320) as shown in FIG. 8. The controller 220 determines whether additional ejector heads are to be cleaned (block 324). If additional ejector heads are to be cleaned, for example, ejector head 212 in FIG. 9, the process continues at block 304 by operating the linear motor 132 to move the cleaning cart 100 opposite the next ejector head (FIG. 9). If no more ejector heads are to be cleaned, the process is complete (block 328).

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A cleaning cart for a three-dimensional object printing system comprising:
    a platform including a plurality of bearings configured to move the platform on rails of the three-dimensional object printing system;
    a cleaning mechanism movably mounted to the platform;
    a reservoir tray mounted on the platform;
    a flexure member extending from the reservoir tray, the flexure member being configured to have an end positioned away from an interior volume of the reservoir tray to enable liquid removed from an ejector head to flow along a portion of the flexure member into the interior volume of the reservoir tray;
    an actuator mounted to the platform, the actuator being operatively connected to the cleaning mechanism and the actuator being configured to move the cleaning mechanism relative to the platform to enable the cleaning mechanism to clean the ejector head that is positioned opposite the rails of the printing system and enable the liquid removed from the ejector head to flow along a portion of the flexure member into the interior volume of the reservoir tray.

2. The cleaning cart of claim 1, the cleaning mechanism further comprising:
    a wiper including a wiper blade configured to wipe the ejector head as the actuator moves the cleaning mechanism relative to the platform.

3. The cleaning cart of claim 1, further comprising:
    a linear slide mounted to the platform, the cleaning mechanism being mounted on the linear slide; and
    the actuator including a stepper motor configured to move the cleaning mechanism along the linear slide to move the cleaning mechanism relative to the platform to enable the cleaning mechanism to clean the ejector head.

4. The cleaning cart of claim 3, the actuator including a lead screw driven by the motor and operatively connected to the cleaning mechanism to move the cleaning mechanism relative to the platform.

5. A three-dimensional object printing system, comprising:
    at least one rail;
    an ejector head positioned opposite the at least one rail, the ejector head including an ejector head actuator system configured to move the ejector head vertically with reference to the at least one rail; and
    a cleaning cart including:
        a platform including a plurality of bearings configured to move the platform on the at least one rail of the three-dimensional object printing system;
        a cleaning mechanism movably mounted to the platform;
        a reservoir tray mounted on the platform;
        a flexure member extending from the reservoir tray, the flexure member being configured to have an end positioned away from an interior volume of the reservoir tray to enable liquid removed from the ejector head to flow along a portion of the flexure member into the interior volume of the reservoir tray;

an actuator mounted to the platform, the actuator being operatively connected to the cleaning mechanism and the actuator being configured to move the cleaning mechanism relative to the platform to enable the cleaning mechanism to clean the ejector head that is positioned opposite the at least one rail of the printing system and enable the liquid removed from the ejector head to flow along a portion of the flexure member into the interior volume of the reservoir tray.

6. The printing system of claim 5, further comprising:
a rail actuator system configured to move the cleaning cart along the at least one rail in a process direction.

7. The printing system of claim 6, further comprising:
a controller operatively connected to the actuator, the rail actuator system, and the ejector head actuator system, the controller being configured to:
  operate the rail actuator system to move the cleaning cart in a process direction to a first cart position at which the cleaning mechanism is located opposite the ejector head,
  operate the ejector head actuator system to move the ejector head from an initial ejector head position spaced apart from the cleaning mechanism to a first ejector head position at which the ejector head contacts the cleaning mechanism, and
  operate the actuator to move the cleaning mechanism relative to the platform from a first cleaning mechanism position to a second cleaning mechanism position to enable the cleaning mechanism to remove the liquid from the ejector head as the cleaning mechanism moves from the first cleaning mechanism position to the second cleaning mechanism position.

8. The printing system of claim 7, the cleaning mechanism further comprising:
  a wiper including a wiper blade configured to wipe a face of the ejector head during movement of the cleaning mechanism from the first cleaning mechanism position to the second cleaning mechanism position when the ejector head is in the first ejector head position and the cleaning cart is in the first cart position.

9. The printing system of claim 8
wherein the flexure member is positioned to enable the wiper blade to engage the flexure member in the second cleaning mechanism position to enable the liquid removed from the ejector head by the wiper blade to flow along a portion of the flexure member into the interior volume of the reservoir tray.

10. The printing system of claim 9, the controller being further configured to operate the ejector head actuator system to move the ejector head from the first ejector head position to the initial ejector head position after the cleaning mechanism is in the second cleaning mechanism position, and operate the actuator to move the cleaning mechanism from the second cleaning member position to the first cleaning member position after moving the ejector head to the initial ejector head position.

11. The printing system of claim 5, the cleaning cart further comprising:
  a linear slide mounted to the platform, the cleaning mechanism being mounted on the linear slide; and
  the actuator including a motor configured to move the cleaning mechanism along the linear slide to move the cleaning mechanism relative to the platform to enable the cleaning mechanism to clean the ejector head.

12. The printing system of claim 11, the actuator including a lead screw driven by the motor and operatively connected to the cleaning mechanism to move the cleaning mechanism relative to the platform.

* * * * *